(12) United States Patent
Lai

(10) Patent No.: US 7,445,512 B1
(45) Date of Patent: Nov. 4, 2008

(54) MULTI-IN-ONE CARD CONNECTOR HAVING A LIFT BOARD

(75) Inventor: Yaw-Huey Lai, Taipei County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 12/073,089

(22) Filed: Feb. 29, 2008

(30) Foreign Application Priority Data

Aug. 24, 2007 (TW) .............................. 96214161 U

(51) Int. Cl.
H01R 24/00 (2006.01)
(52) U.S. Cl. ..................................................... 439/630
(58) Field of Classification Search .................. 439/630, 439/631, 637, 267, 260
See application file for complete search history.

(56) References Cited

U.S. PATENT DOCUMENTS

| | | | | |
|---|---|---|---|---|
| 3,651,444 A | * | 3/1972 | Desso et al. ................. | 439/680 |
| 6,174,186 B1 | * | 1/2001 | Hashiguchi et al. ......... | 439/267 |
| 6,431,890 B1 | * | 8/2002 | Li et al. ....................... | 439/160 |
| 6,648,693 B1 | * | 11/2003 | Hogan et al. ................. | 439/630 |
| 6,721,186 B2 | * | 4/2004 | Yang ............................ | 439/327 |
| 6,821,135 B1 | * | 11/2004 | Martin ......................... | 439/144 |
| 6,908,321 B1 | | 6/2005 | Lai | |
| 7,048,588 B2 | | 5/2006 | Chang | |
| 2006/0089051 A1 | * | 4/2006 | Ko ............................... | 439/630 |

* cited by examiner

Primary Examiner—Briggitte R Hammond
(74) Attorney, Agent, or Firm—Bacon & Thomas, PLLC

(57) ABSTRACT

A multi-in-one card connector allowing exclusive entry of one single card once and having the characteristics of low profile and short length is disclosed to include an electrically insulative housing, which has two upright sidewalls at two sides of a bottom panel thereof and a cover plate covering the upright sidewalls and defining with the bottom panel a front opening and a card-receiving space, multiple sets of metal terminals mounted on the bottom panel inside the housing at different locations, a lift board vertically movably mounted in the housing and dividing the front opening into relatively adjustable first opening and second opening, two first positioning devices bilaterally provided in the housing, two second positioning devices bilaterally provided at the lift board, and two spring members respectively connected between the first positioning devices and the second positioning devices to force the lift board vertically in one direction.

11 Claims, 9 Drawing Sheets

MULTI-IN-ONE CARD CONNECTOR HAVING A LIFT BOARD

BACKGROUND OF THE INVENTION

1. Field of the Invention

The present invention relates to electrical connection devices and more particularly, to a multi-in-one card connector having a lift board.

2. Description of the Related Art

Various multi-in-one card connectors are known disclosed for use with a card reader to fit different card members. In order to prevent a reading error due to insertion of multiple cards at a time, multi-in-one card connectors that allow insertion of only one card member are created.

U.S. Pat. No. 6,908,321 discloses an all-in-one card connector exclusive for entry of one single electronic card once. According to this design of all-in-one card connector, two movable guide members are provided at two sides inside the card connector. By means of vertical displacement of the movable guide members, one single electronic card is exclusively insertable into the card connector once. Further, front and rear stop means are necessary to keep movement of the guide members. This design requires a long length of the connector body.

Further, U.S. Pat. No. 7,048,588 disclosed another design of all-in-one card connector, entitled "Multiple port memory card connector". This design comprises a lower dielectric housing part having a terminal-mounting base and a pair of side wall sections extending forwardly from opposite sides of the base, an upper dielectric housing part mounted on top of the lower housing part and having a terminal-mounting roof, a card locating plate connected at opposite sides thereof to the side wall sections of the lower housing part and combining therewith to define a first card-receiving space beneath the plate. The card locating plate is spaced from the roof of the upper housing part and combines therewith to define a second card-receiving space above the plate. According to this design, the first card-receiving space and the second card-receiving space are discrete spaces unlike the respectively that are defined above and below the card locating plate unlike the vertical displacement design of the movable guide members of the aforesaid U.S. Pat. No. 6,908,321. Because the first card-receiving space and the second card-receiving space are discrete spaces, the card connector has a certain thickness that does not satisfy the low profile requirement.

SUMMARY OF THE INVENTION

The present invention has been accomplished under the circumstances in view. It is one object of the present invention to provide a multi-in-one card connector that allows exclusive entry of one single card once and has low profile and short length characteristics.

To achieve this and other objects of the present invention, the multi-in-one card connector comprises a housing that is electrically insulative, multiple sets of metal terminals, a lift board, and two spring members. The housing comprises a bottom panel, two upright sidewalls respectively upwardly extending from two opposite lateral sides of the bottom panel, a cover plate covering the upright sidewalls and defining with the d bottom panel a card-receiving space and a front opening in communication with the card-receiving space, and first positioning means bilaterally disposed in the housing near the front opening. The multiple sets of metal terminals include at least a set of first metal terminals mounted on the bottom panel inside the housing near a front side, and a set of second metal terminals mounted on the bottom panel inside the housing near a rear side. The lift board is mounted in the housing to divide the front opening of the housing into a first opening at an upper side and a second opening at a lower side. The lift board is vertically movable in the housing to adjust the relative height of the first opening and the relative height of the second opening. The lift board has second positioning means disposed at two sides corresponding to the first positioning means. The two spring members are provided between the lift board and a part of the housing, each having two opposite ends respectively connected to the first positioning means and the second positioning means. The spring members are adapted to impart a pressure to the lift board in a predetermined direction. By means of the aforesaid arrangement, the multi-in-one card connector allows exclusive entry of one single memory card once, and has the characteristics of low profile and short length.

DETAILED DESCRIPTION OF THE INVENTION

Figure 1:
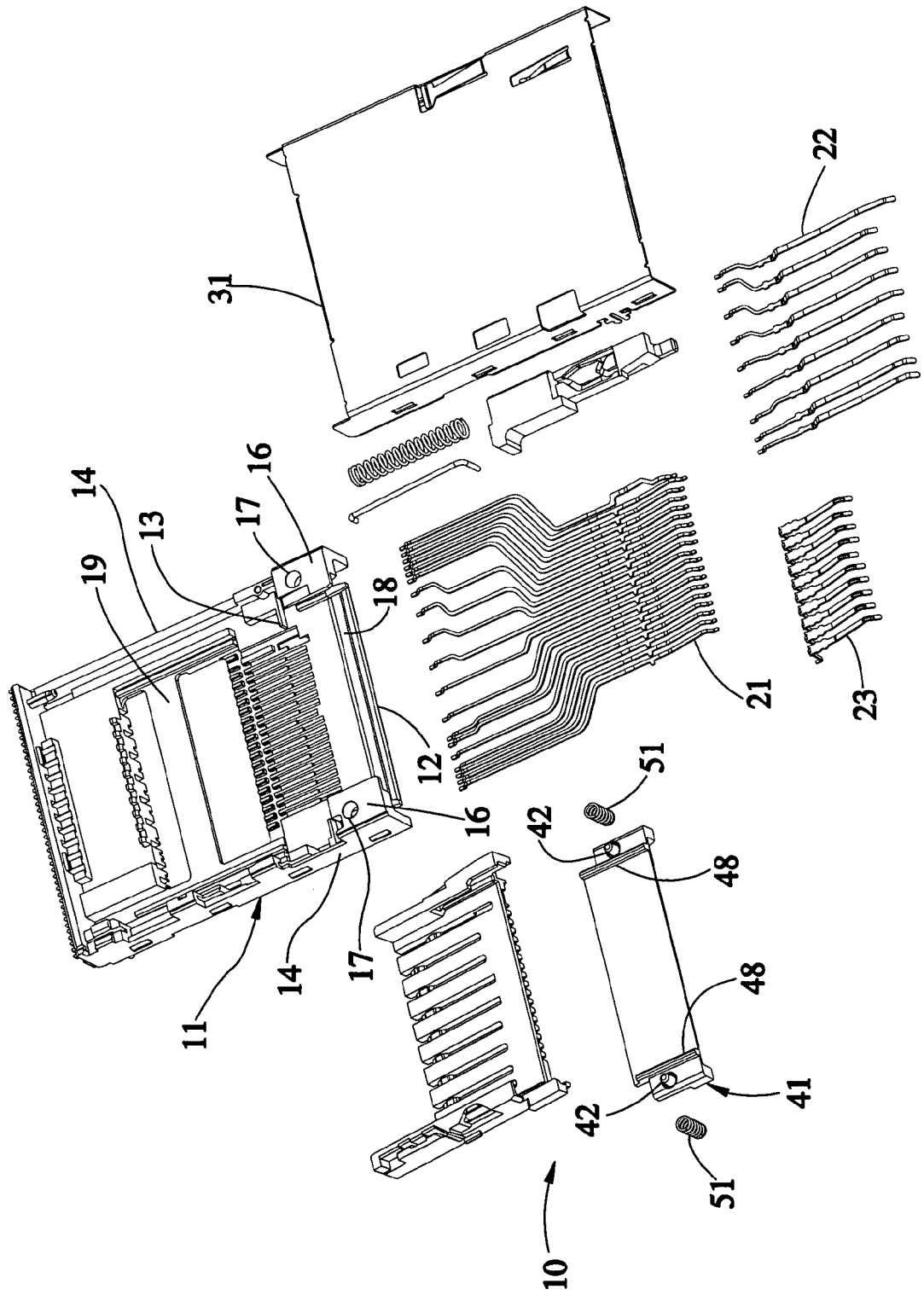
FIG. 1 is an exploded view of a multi-in-one card connector in accordance with a first embodiment of the present invention.
Figure 2:
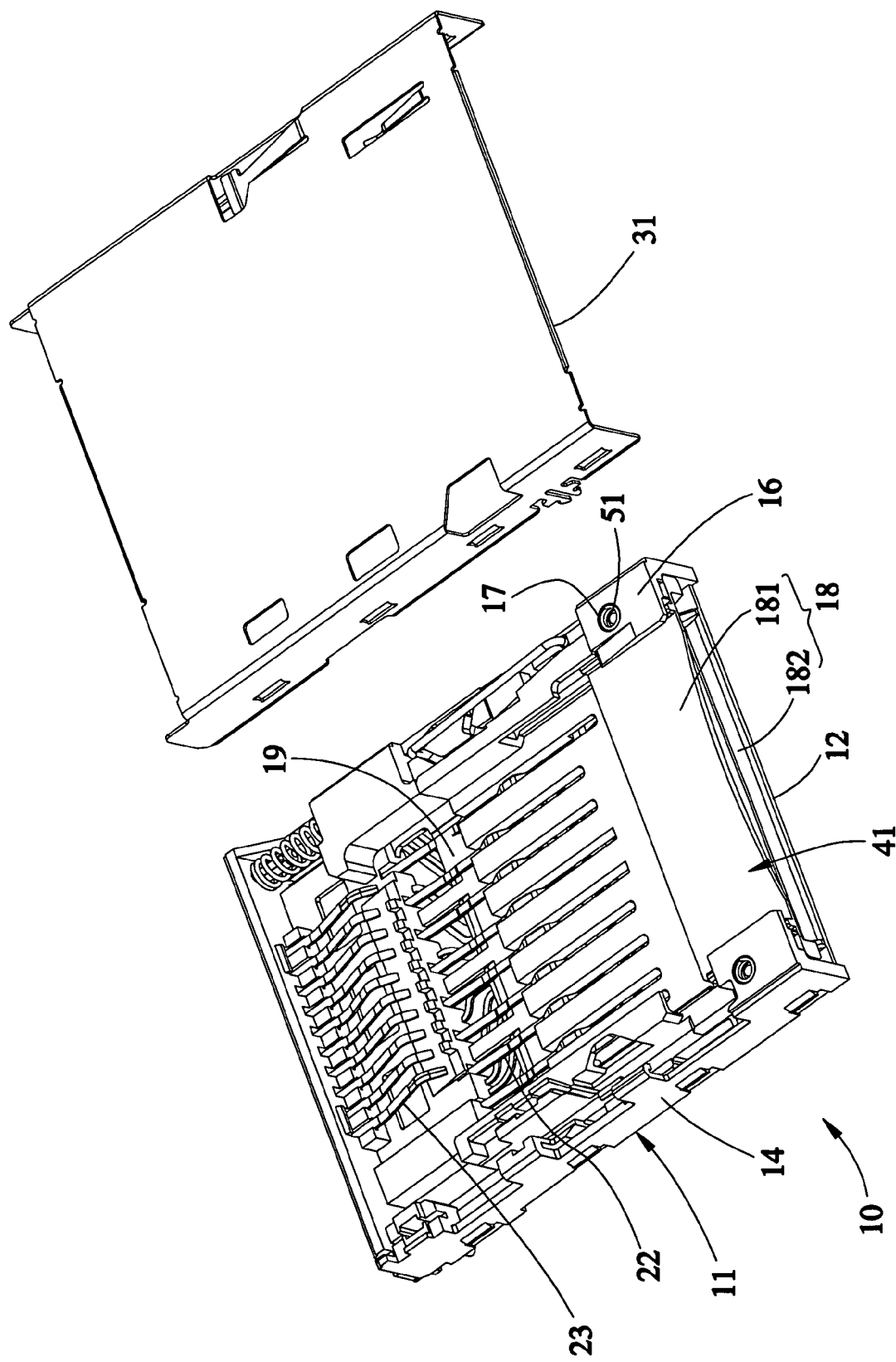
FIG. 2 is a schematic assembly view of the multi-in-one card connector in accordance with the first embodiment of the present invention, showing the internal arrangement after removal of the cover plate from the housing.
Figure 3:
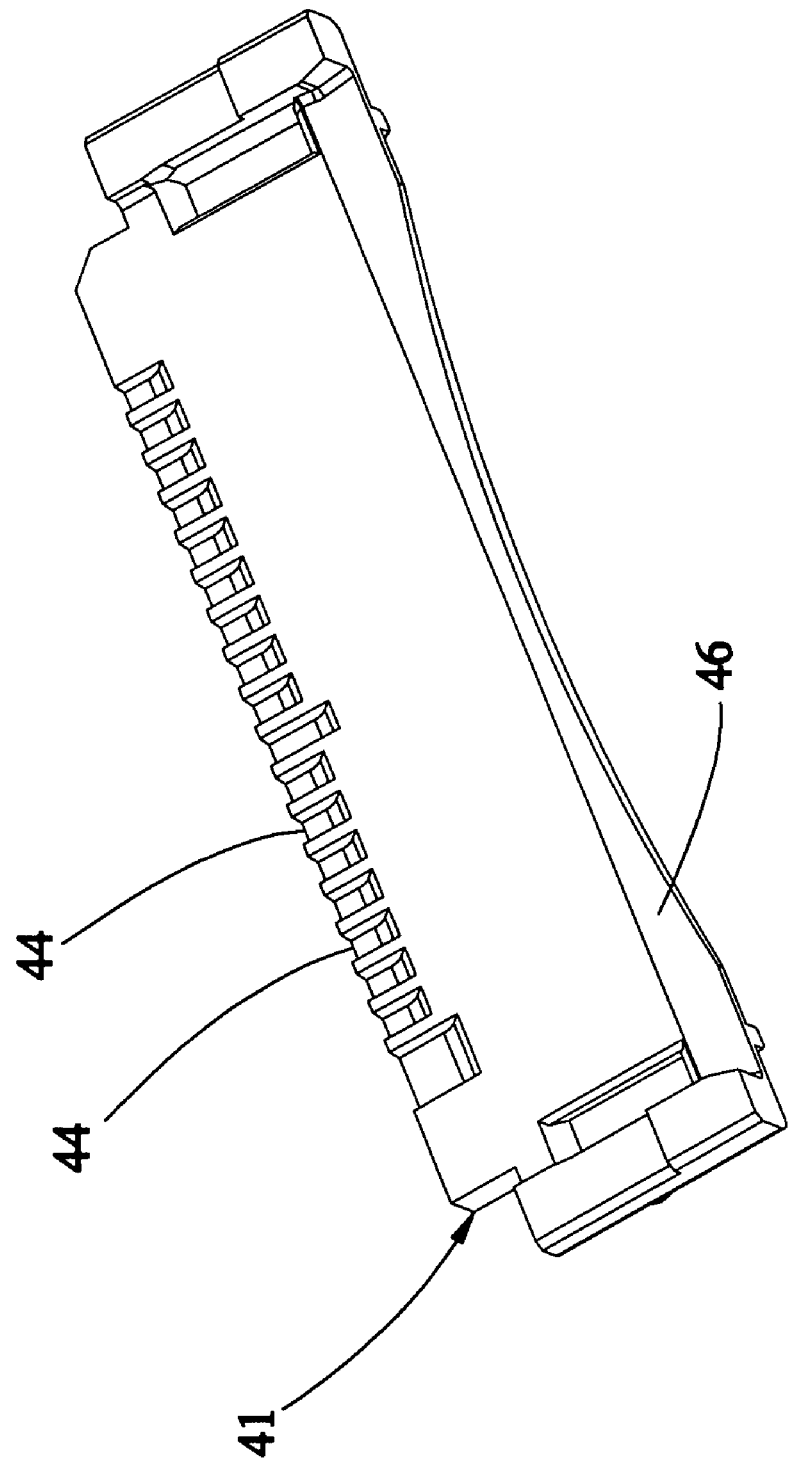
FIG. 3 is an oblique bottom elevation of the lift board for the multi-in-one card connector in accordance with the first embodiment of the present invention.
Figure 4:
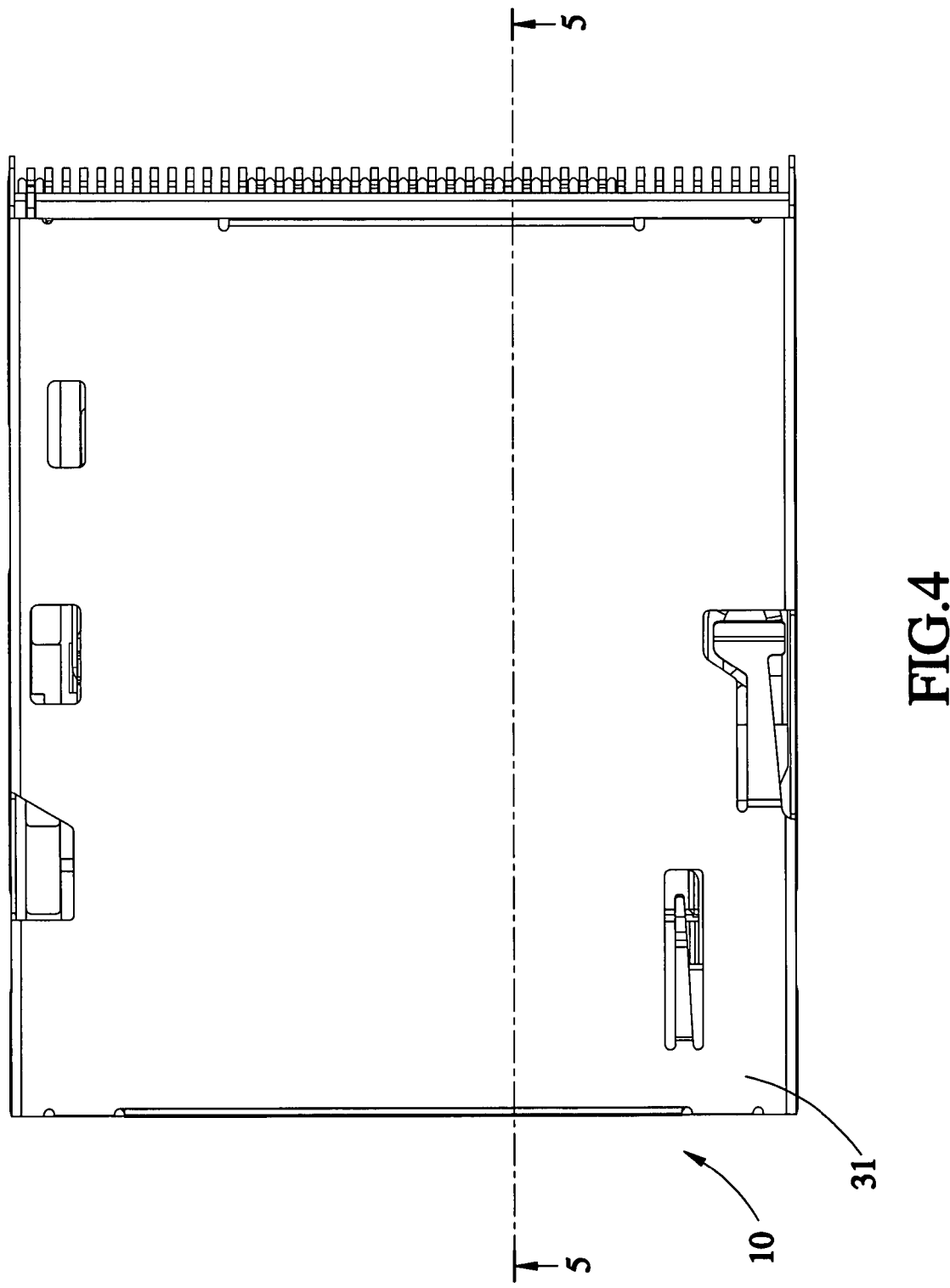
FIG. 4 is a top view of the multi-in-one card connector in accordance with the first embodiment of the present invention

Referring to FIGS. 1-5, a multi-in-one card connector 10 in accordance with a first embodiment of the present invention is shown comprising a housing 11, three sets of metal terminals 21, 22 and 23, a cover plate 31, a lift board 41, and two spring members 51.

The housing 11 is electrically insulative, comprising a bottom panel 12, two upright sidewalls 14 respectively upwardly extending from two opposite lateral sides of the bottom panel 12, two shoulder plates 16 respectively perpendicularly extending from the rear part of the top of the upright sidewalls 14 toward each other, and the cover plate 31 that covers the upright sidewalls 14 and the shoulder plates 16 and defining therewith a card-receiving space 19 and an opening 18 in front of the card-receiving space 19. The shoulder plates 16 each have a first positioning means 17. According to this embodiment, the first positioning means 17 is a through hole. The bottom panel 12 has a stop face 13 in the front part.

The three sets of metal terminals 21~23 include a set of first metal terminals 21, a set of second metal terminals 22 and a set of third metal terminals 23 arranged on the bottom panel 12 at different locations spaced in direction from the front side of the base panel 12 toward the rear side thereof. The set of first metal terminals 21 corresponds to a memory card of XD (eXtreme Digital) standard. The set of second metal terminals 22 corresponds to a memory card of SD (Secure Digital) or MMC (Multi-Media Card) standard. The set of third metal terminals 33 corresponds to a memory card of MS (Memory Stick) standard.

The lift board 41 is vertically movably mounted in the housing 11 above the set of first terminals 21. The lift board 41 divides the opening 18 into a first opening 181 at an upper side and a second opening 182 at a lower side. Subject to vertical displacement of the lift board 41, the upper first opening 181 and the lower second opening 182 are partially overlapped. The lift board 41 has two second positioning means 42 bilaterally disposed at the top. According to this embodiment, the two second positioning means 42 are pins spaced below and respectively aimed at the first positioning means 17 of the shoulder plates 16. The lift board 41 further has a plurality of grooves 44 on the bottom side. The first terminals 21 are respectively positioned in the grooves 44. The rear side of the lift board 41 is stopped against the stop face 13. The lift board 41 has a sloping face 46 on the front bottom side, and therefore the second opening 182 has a height gradually reducing toward the inside. The lift board 41 has two guide rids 48 bilaterally disposed at the top to fit the configuration of the two lateral sides of the bottom wall of a SD card 91 (see FIG. 6).

The two spring members 51 are bilaterally arranged on the lift board 41, having the respective two opposite ends respectively fastened to the first positioning means 17 and the second positioning means 41, i.e., the spring members 51 each have one end respectively affixed to the first positioning means (through holes) 17 and stopped against the cover plate 31 that surrounds the shoulder plates 16 and the other end sleeved onto the second positioning means (pins) 42. The spring power of the spring members 51 is acted upon the lift board 41, forcing the lift board 41 downwards.

The use of the multi-in-one card connector is outlined hereinafter.

Figure 5:
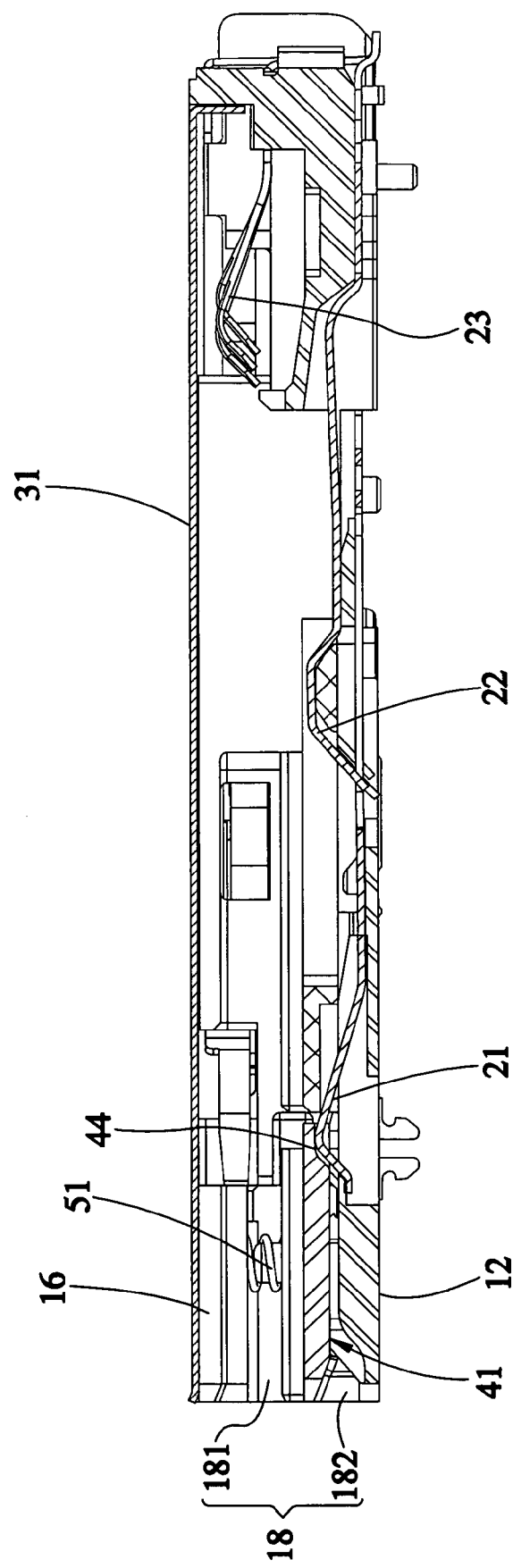
FIG. 5 is a sectional view taken along line 5-5 of FIG. 4.

Referring to FIG. 5, before insertion of a memory card into the multi-in-one card connector, the spring power of the spring members 51 holds the lift board 41 in the lower limit position within its range of displacement.

Figure 6:
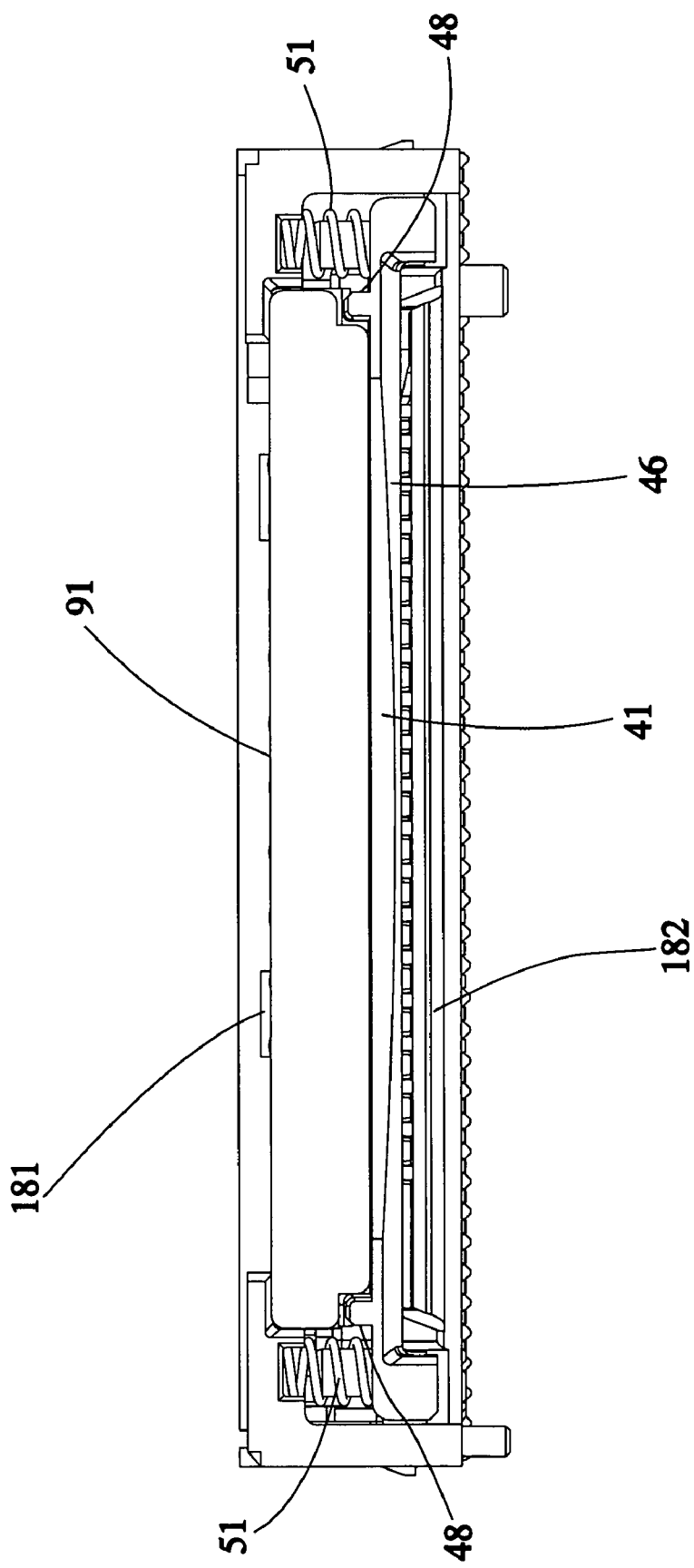
FIG. 6 is a schematic front view of the first embodiment of the present invention, showing a SD card inserted into the multi-in-one card connector.

Referring to FIG. 6, when inserting a SD card 91 into the multi-in-one card connector 10, the SD card 91 is inserted through the first opening 181. During insertion, the SD card 91 is directly moved from the first opening 181 into the card receiving space 19, and the guide rids 41 of the lift board 41 guide the SD card 91 into position. After the SD card 91 has been inserted into position, the SD card 91 holds down the lift board 41, at this time the lift board 41 is prohibited from upward displacement and blocks the second opening 182 to prohibit insertion of a card into the second opening 182. When removing the SD card 91 from the multi-in-one card connector 10, the SD card 91 is directly pulled out of the housing 11 or ejected by means of a card ejector (not shown). A card ejector for this purpose can easily be obtained from conventional techniques. No further description in this regard is necessary. If there is a memory card inserted above the lift board 41, the lift board 41 is at the bottom side to hold down the set of first metal terminals 21 (see FIG. 5), protecting the set of first metal terminals 21 from impact or friction of the memory card above.

Figure 7:
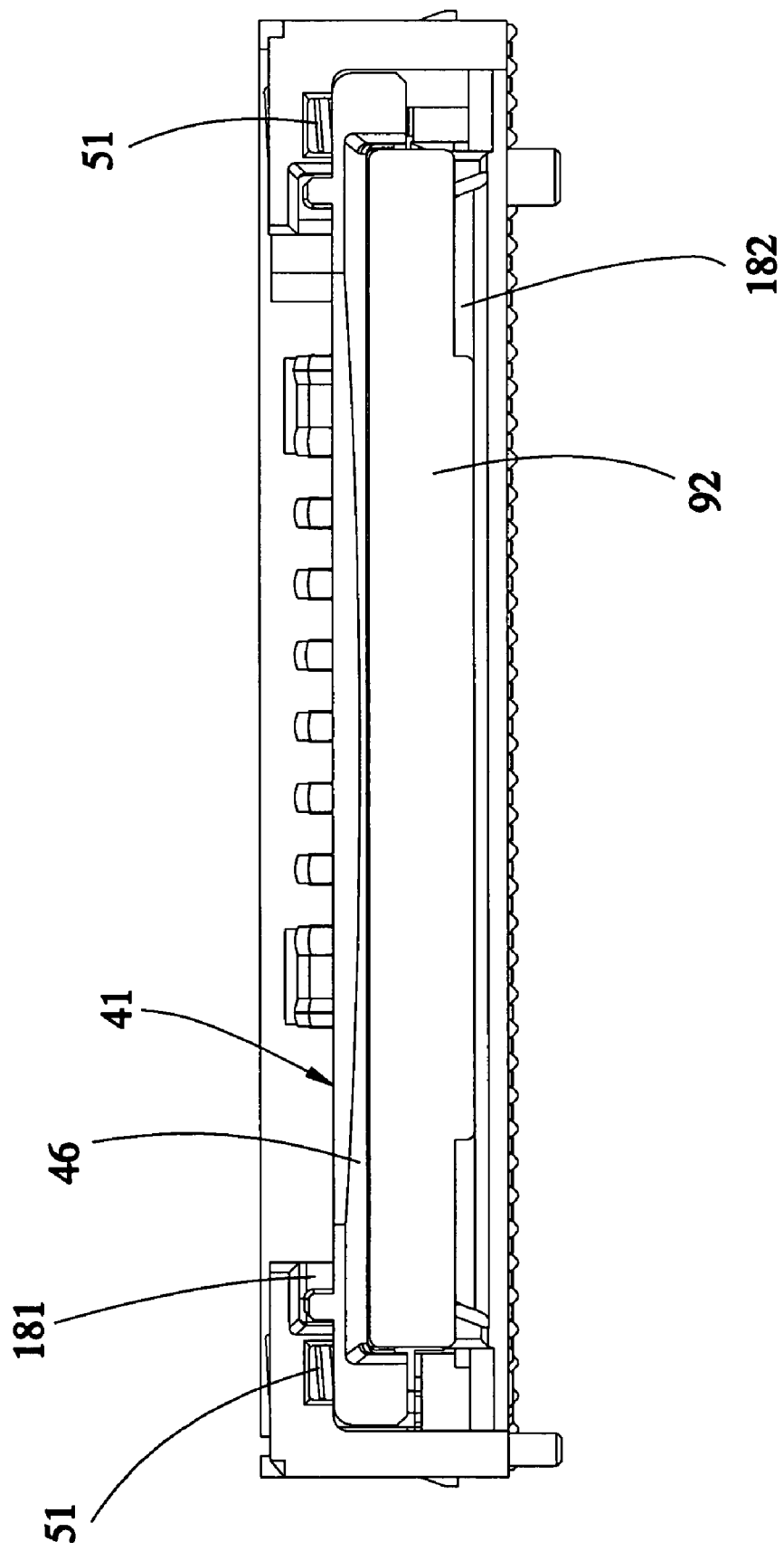
FIG. 7 is a schematic front view of the first embodiment of the present invention, showing a XD card inserted into the multi-in-one card connector.

Referring to FIG. 7, when inserting a XD card 92 into the multi-in-one card connector 10, the XD card 92 is inserted through the second opening 182. During insertion, the front edge of the XD card 92 is forced against the sloping face 46 of the lift board 41. Therefore, continuous insertion of the XD card 92 will lift the lift board 41 to expand the second opening 182 and to narrow the first opening 181. After the XD card 92 has been inserted into position, the lift board 41 is in the top position, at this time the narrowed first opening 181 When removing the XD card 92 from the multi-in-one card connector 10, the XD card 92 is directly pulled out of the housing 11 or ejected by means of a card ejector.

In the aforesaid operation procedure, either the insertion of a SD card 91 into the first opening 181 or a XD card 92 into the second opening 182, the effect of the spring members 51 and stop face 13 prohibits backward displacement of the lift board 41, and therefore the lift board 41 can only be moved vertically and is prohibited from backward displacement, i.e., the lift board 41 will never move out of its range of displacement even if it receives an impact from the inserted memory card. Further, during removal of the inserted memory card, the friction force produced between the memory card and the lift board 41 does cause forward displacement of the lift board 41 because the effect of the spring members 51 and effect of the first positioning means 17 and second positioning means 42 keep the lift board 41 in place.

Figure 8:
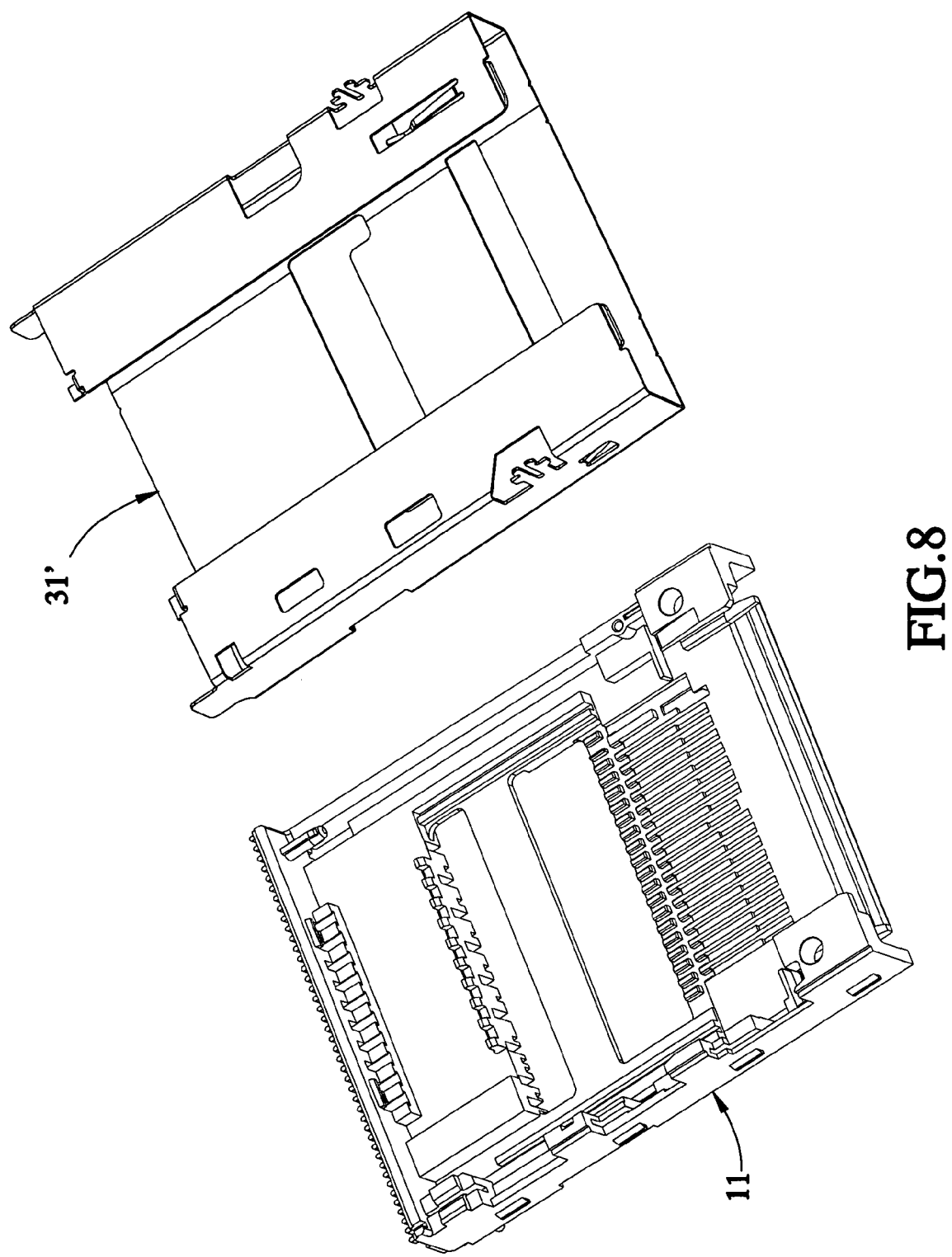
FIG. 8 is an exploded view of the first embodiment of the multi-in-one card connector in accordance with the first embodiment of the present invention, showing an alternate form of the cover plate.

FIG. 8 illustrates an alternate form of the cover plate 31' that surrounds at least a part of the bottom panel 12 of the housing 1.

Figure 9:
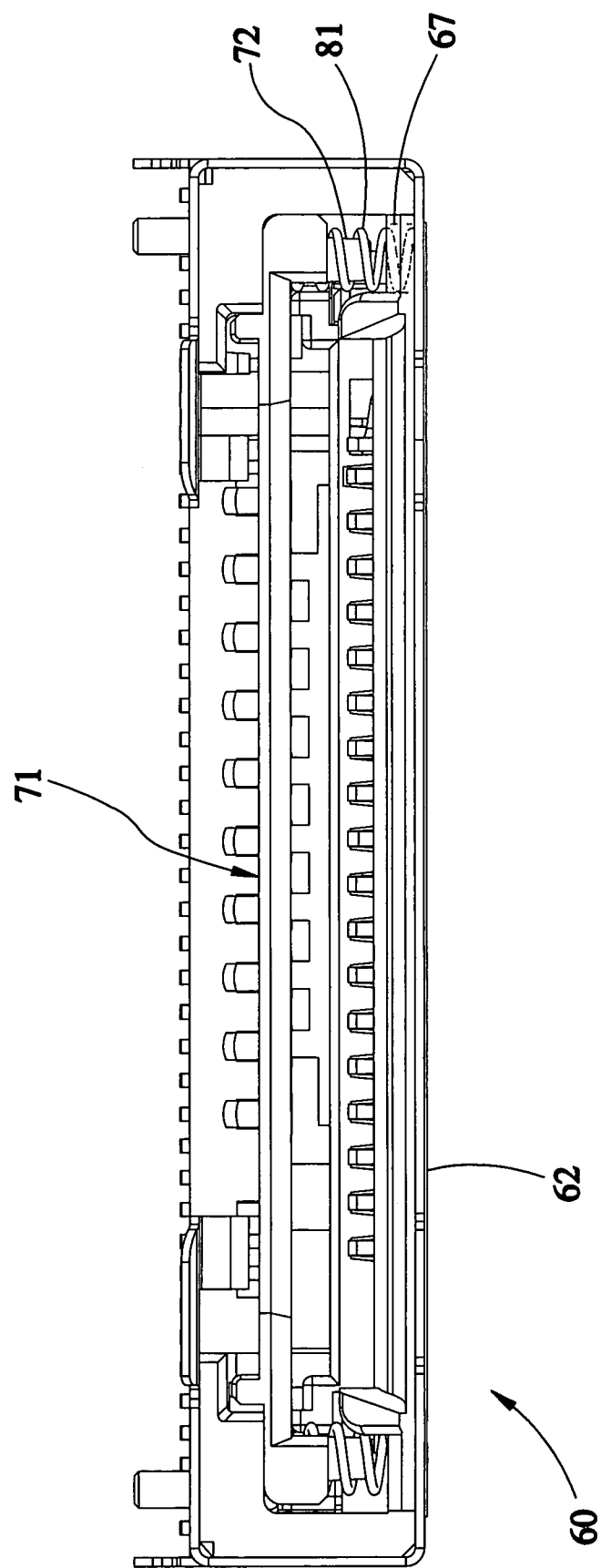
FIG. 9 is a schematic front view of a multi-in-one card connector in accordance with a second embodiment of the present invention.

FIG. 9 illustrates an all-in-one card connector 60 in accordance with a second embodiment of the present invention. This second embodiment is substantially similar to the aforesaid first embodiment with the exception that:

The two first positioning means 67 are bilaterally disposed at the front side of the bottom panel 62, the two second positioning means 72 are bilaterally disposed at the bottom wall of the lift board 71, and the spring members 81 are adapted to impart an upward pressure to the lift board 71. According to this embodiment, the two first positioning means 67 are insertion slots, and the two second positioning means 72 are pins for fitting into the first positioning means (insertion slots) 67. Further, the spring members 81 are respectively connected between the first positioning means 67 and the second positioning means 72 to impart an upward pressure to the lift board 71.

The operation and effect of this second embodiment are same as the aforesaid first embodiment, and therefore no further detailed description in this regard is necessary.

As stated above, the invention has the advantages and features as follows:

1. Low profile with metal terminal protection: The arrangement of the lift board allows the first opening and the second opening to share a common space, thereby shortening thickness requirement. U.S. Pat. No. 6,908,321 saves vertical space requirement by means of the working effect of the movable guide members, however the movable guide members do not provide protection for the metal terminals. The lift board of the present invention is provided above the set of first metal terminals. Upon insertion of a SD card into the multi-in-one card connector, the lift board is pressed on the set of first metal terminals, preventing contact between the SD card and the set of first metal terminals, and therefore the set of first metal terminals is well protected.

2. Reduction of connector length: The effect of reduction of connector length is achieved by means of the effect of the spring members and the connection between the first positioning means and the second positioning means to secure the lift board from horizontal displacement. This design eliminates the requirement of front and rear stop members to stop the lift board from horizontal displacement. The stop face of the present invention is simply an enhancement design, not the requisite.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multi-in-one card connector comprising:

a housing being electrically insulative, said housing comprising a bottom panel, two upright sidewalls respectively upwardly extending from two opposite lateral sides of said bottom panel, a cover plate covering said upright sidewalls and defining with said bottom panel a card-receiving space and a front opening in communication with said card-receiving space, and first positioning means bilaterally disposed in said housing near said front opening;

multiple sets of metal terminals, said multiple sets of metal terminal including at least a set of first metal terminals mounted on said bottom panel inside said housing near a front side and a set of second metal terminals mounted on said bottom panel inside said housing near a rear side;

a lift board mounted in said housing to divide said front opening of said housing into a first opening at an upper side and a second opening at a lower side, said lift board being vertically movable in said housing to adjust the relative height of said first opening and the relative height of said second opening, said lift board having second positioning means disposed at two sides corresponding to said first positioning means; and two spring members provided between said lift board and a part of said housing, said spring members each having two opposite ends respectively connected to said first positioning means and said second positioning means and being adapted to impart a pressure to said lift board in a predetermined direction.

2. The multi-in-one card connector as claimed in claim 1, wherein said housing comprises two shoulder plates respectively extending from said upright sidewalls in direction toward each other; said first positioning means is disposed at said two shoulder plates; said second positioning means is bilaterally disposed at a top wall of said lift board; said spring means are adapted to impart a downward pressure to said lift board to force said lift board downwards.

3. The multi-in-one card connector as claimed in claim 2, wherein said first positioning means comprises two through holes respective formed on said shoulder plates; said cover plate covers a top side of each of said shoulder plates; said spring members are respectively mounted in said through holes and stopped against said cover plate.

4. The multi-in-one card connector as claimed in claim 1, wherein said lift board is disposed above the set of said first metal terminals.

5. The multi-in-one card connector as claimed in claim 4, wherein said lift board has a plurality of grooves on a bottom wall thereof; said first metal terminals are respectively positioned ins aid grooves.

6. The multi-in-one card connector as claimed in claim 1, wherein said bottom panel has a stop face near a front side thereof; said lift board has a rear side stopped against said stop face.

7. The multi-in-one card connector as claimed in claim 1, wherein said second positioning means comprises two pins bilaterally extending from said lift board.

8. The multi-in-one card connector as claimed in claim 1, wherein said lift board has sloping face on a front bottom side thereof.

9. The multi-in-one card connector as claimed in claim 1, wherein said lift board has two guide ribs bilaterally disposed at a top wall thereof.

10. The multi-in-one card connector as claimed in claim 1, wherein said first positioning means is bilaterally disposed at a front side of said bottom panel; said second positioning means is bilaterally disposed at a bottom wall of said lift board;

said two spring members are adapted to impart an upward pressure to said lift board to force said lift board upwards.

11. The multi-in-one card connector as claimed in claim 10, wherein said first positioning means is comprised of two insertion slots.

* * * * *